United States Patent
Nurmukhanov et al.

(10) Patent No.: US 9,786,286 B2
(45) Date of Patent: Oct. 10, 2017

(54) METHODS AND APPARATUSES FOR GENERATING AND USING LOW-RESOLUTION PREVIEW TRACKS WITH HIGH-QUALITY ENCODED OBJECT AND MULTICHANNEL AUDIO SIGNALS

(71) Applicant: Dolby Laboratories Licensing Corporation, San Francisco, CA (US)

(72) Inventors: Dossym Nurmukhanov, South San Francisco, CA (US); Sripal S. Mehta, San Francisco, CA (US); Stanley G. Cossette, Brisbane, CA (US); Nicolas R. Tsingos, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 57 days.

(21) Appl. No.: 14/781,126

(22) PCT Filed: Mar. 13, 2014

(86) PCT No.: PCT/US2014/025426
§ 371 (c)(1),
(2) Date: Sep. 29, 2015

(87) PCT Pub. No.: WO2014/159898
PCT Pub. Date: Oct. 2, 2014

(65) Prior Publication Data
US 2016/0055854 A1  Feb. 25, 2016

Related U.S. Application Data

(60) Provisional application No. 61/806,726, filed on Mar. 29, 2013.

(51) Int. Cl.
*G10L 19/008* (2013.01)
*H04S 3/00* (2006.01)
(Continued)

(52) U.S. Cl.
CPC ............ *G10L 19/008* (2013.01); *G10L 21/00* (2013.01); *G11B 27/031* (2013.01);
(Continued)

(58) Field of Classification Search
None
See application file for complete search history.

(56) References Cited

U.S. PATENT DOCUMENTS 5,890,125 A  *  3/1999  Davis .................... G10L 19/008
                                                    381/1
6,600,869 B1    7/2003  Chen
(Continued)

FOREIGN PATENT DOCUMENTS

EP          1760718       3/2007
RS           1332 U       8/2013
(Continued)

OTHER PUBLICATIONS

Faller, Christof "Coding of Spatial Audio Compatible with Different Playback Formats" AES Convention, Oct. 31, 2004.
(Continued)

*Primary Examiner* — Curtis Kuntz
*Assistant Examiner* — Qin Zhu

(57) ABSTRACT

A low-quality rendition of a complex soundtrack is created, synchronized and combined with the soundtrack. The low-quality rendition may be monitored in mastering operations, for example, to control the removal, replacement or addition of aural content in the soundtrack without the need for expensive equipment that would otherwise be required to render the soundtrack.

20 Claims, 2 Drawing Sheets

(51) Int. Cl.
*G11B 27/036* (2006.01)
*G11B 27/031* (2006.01)
*G10L 21/00* (2013.01)

(52) U.S. Cl.
CPC ............ *G11B 27/036* (2013.01); *H04S 3/008* (2013.01); *H04S 2400/03* (2013.01)

(56) References Cited

U.S. PATENT DOCUMENTS

| | | | | |
|---|---|---|---|---|
| 2003/0187663 | A1* | 10/2003 | Truman | G10L 21/038 704/500 |
| 2004/0015349 | A1* | 1/2004 | Vinton | G10L 19/02 704/230 |
| 2006/0206221 | A1* | 9/2006 | Metcalf | G10H 1/0091 700/94 |
| 2007/0140499 | A1* | 6/2007 | Davis | G10L 19/008 381/23 |
| 2008/0219641 | A1 | 9/2008 | Sandrew | |
| 2011/0191679 | A1 | 8/2011 | Lin | |
| 2012/0183148 | A1 | 7/2012 | Cho | |
| 2013/0179535 | A1* | 7/2013 | Baalu | H04S 7/30 709/217 |
| 2014/0188488 | A1* | 7/2014 | Schug | G10L 19/008 704/500 |

FOREIGN PATENT DOCUMENTS

| | | |
|---|---|---|
| WO | 2008/035275 | 3/2008 |
| WO | 2009/049895 | 4/2009 |
| WO | 2010/040522 | 4/2010 |
| WO | 2010/085677 | 7/2010 |
| WO | 2011/020067 | 2/2011 |
| WO | 2013/006322 | 1/2013 |
| WO | 2013/006330 | 1/2013 |

OTHER PUBLICATIONS

Stanojevic, T. "Some Technical Possibilities of Using the Total Surround Sound Concept in the Motion Picture Technology", 133rd SMPTE Technical Conference and Equipment Exhibit, Los Angeles Convention Center, Los Angeles, California, Oct. 26-29, 1991.

Stanojevic, T. et al "Designing of TSS Halls" 13th International Congress on Acoustics, Yugoslavia, 1989.

Stanojevic, T. et al "The Total Surround Sound (TSS) Processor" SMPTE Journal, Nov. 1994.

Stanojevic, T. et al "The Total Surround Sound System", 86th AES Convention, Hamburg, Mar. 7-10, 1989.

Stanojevic, T. et al "TSS System and Live Performance Sound" 88th AES Convention, Montreux, Mar. 13-16, 1990.

Stanojevic, T. et al. "TSS Processor" 135th SMPTE Technical Conference, Oct. 29-Nov. 2, 1993, Los Angeles Convention Center, Los Angeles, California, Society of Motion Picture and Television Engineers.

Stanojevic, Tomislav "3-D Sound in Future HDTV Projection Systems" presented at the 132nd SMPTE Technical Conference, Jacob K. Javits Convention Center, New York City, Oct. 13-17, 1990.

Stanojevic, Tomislav "Surround Sound for a New Generation of Theaters, Sound and Video Contractor" Dec. 20, 1995.

Stanojevic, Tomislav, "Virtual Sound Sources in the Total Surround Sound System" Proc. 137th SMPTE Technical Conference and World Media Expo, Sep. 6-9, 1995, New Orleans Convention Center, New Orleans, Louisiana.

Plumbley, M. et al "Object-Coding for Resolution-Free Musical Audio" AES Conference: 31st International Conference: New Directions in High Resolution Audio, Jun. 2007.

* cited by examiner

METHODS AND APPARATUSES FOR GENERATING AND USING LOW-RESOLUTION PREVIEW TRACKS WITH HIGH-QUALITY ENCODED OBJECT AND MULTICHANNEL AUDIO SIGNALS

CROSS REFERENCE TO RELATED APPLICATIONS

This application claims priority to U.S. Provisional Application No. 61/806,726 filed on 29 Mar. 2013, incorporated herein by reference in its entirety.

TECHNICAL FIELD

The present application pertains generally to the processing and distribution of video/audio content such as that used in cinema and broadcast applications.

BACKGROUND ART

Recent advances in digital cinematic sound provided by the Dolby® Atmos™ system of products have introduced a large increase in the number of independent audio signals used to drive loudspeakers, a large increase in the number of audio tracks carrying aural content that are processed to generate these audio signals, and an increase in the sample bit length and sample rate of digital audio data used to represent these audio signals.

The first generation of Dolby Atmos supports up to 128 discrete audio tracks to generate audio signals that drive up to sixty-four independent channels of loudspeakers. A Dolby Atmos system can provide each loudspeaker channel with its own unique signal, thereby allowing the use of loudspeakers in new positions such as on an auditorium ceiling.

An audio track may carry aural content for an audio object that represents a sound source at some specified spatial position, which is expressed relative to some reference location such as the center of a cinematic projection screen or any other point that may be desired. Any type of acoustic or content-related information such as perceived acoustic size may also be included. The position conveyed by the audio track may change if the sound source is intended to move relative to the reference location. An audio track may also carry aural content for a conventional "fixed channel" that corresponds to one or more loudspeakers at a specified fixed position relative to the reference location.

During playback, the audio tracks are processed to generate the audio signals that are appropriate for driving the loudspeakers that are present for a particular installation. The intent of these advances is to improve the listening experience of cinema viewers by immersing them in an enveloping sound field that is perceived as being as realistic as possible given limits imposed by the number and placement of loudspeakers.

As a simple example for aural content with a position at the center of a viewing screen, a signal is generated for a center-channel loudspeaker if an installation has a center-channel speaker. If an installation has only left- and right-channel loudspeakers, signals are generated for both of these channels so that the aural content is panned to the center position. The process becomes much more complex as the number of audio tracks and loudspeaker locations increase. Furthermore, the computational resources needed to process audio tracks for audio objects is typically much greater than those required to process audio tracks for fixed channels. As a result, a considerable amount of computational resources are needed to process or "render" a Dolby Atmos soundtrack.

The cost of such a processor can be justified for playback systems intended for presentation to audiences but it is much harder to justify for systems like those used for mastering, which require presentation of the audio so that video and audio content can be synchronized and assembled into packages for distribution.

DISCLOSURE OF INVENTION

It is an object of the present invention to provide for an efficient way of presenting aural content from complex tracks of audio data that would otherwise require unacceptably high computational resources to render even a low-quality representation of the aural content.

This object is achieved by the methods, apparatuses and media described below and set forth in the claims.

The various features of the present invention and its preferred embodiments may be better understood by referring to the following discussion and the accompanying drawings in which like reference numerals refer to like elements in the several figures. The contents of the following discussion and the drawings are directed more particularly toward some details of the Dolby Atmos system mentioned above; however, these details are described only to help explain concepts of the present invention. The disclosure describes only examples and these examples should not be understood to represent limitations upon the scope of the present invention.

MODES FOR CARRYING OUT THE INVENTION

A. System to Generate Medium

Figure 1:
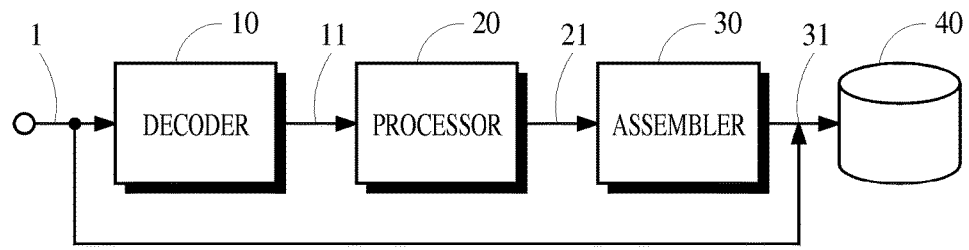
FIG. 1 is a schematic block diagram of a system that may be used to produce a medium that conveys digital audio data for use by a system such as that illustrated in FIG. 2.

FIG. 1 illustrates a schematic block diagram of an exemplary system that generates a medium with digital audio data for use according to teachings of the present invention. In this exemplary system, the decoder 10 receives an electromagnetic input signal from the communication path 1. The communication path 1 may be an electrical conductive path such as a copper wire or circuit board trace, an optical waveguide such as an optical fiber or any other medium that is capable of conveying an electromagnetic signal.

The input signal carries digital information arranged in frames. Each frame of the digital information includes encoded digital audio data representing the spatial position and aural content for one or more audio objects. The frame may also include any metadata that is needed to process the encoded digital audio data. The spatial position of each audio object is expressed relative to a reference location. Each audio object corresponds to one or more audio sources and the encoded digital audio data represents the aural content with a first level of accuracy and within a first bandwidth.

The decoder 10 obtains frames of encoded digital audio data from the electromagnetic input signal and decodes a respective frame of the encoded digital audio data to generate decoded digital audio data. The decoding is inverse to the encoding process used to produce the encoded digital audio data. The encoded digital audio data may be generated by using a coding technique such as lossless prediction coding or so-called perceptual encoding process that removes information redundancy and discards portions of original aural content that are deemed to be perceptually irrelevant according to psychoacoustic principles. A suitable prediction coding technique is disclosed in international patent application publication WO 2013/006322 entitled "Sample Rate Scalable Lossless Audio Coding," published Jan. 10, 2013. In implementations that use perceptual coding, the decoder 10 applies a decoding process that recovers the portion of the original aural content that was deemed by the perceptual encoding process to be perceptually relevant. Other types of coding including those that are known in the art as source coding, voice coding and entropy coding may be used. Any coding technique may be used as desired to meet any requirements of the application in which the present invention is used.

The processor 20 receives the decoded digital audio data from the path 11 and processes it to generate one or more preview channels of digital audio data. These preview channels of digital audio data represent the aural content of the respective frame of the encoded digital audio data with a second level of accuracy that is less than the first level of accuracy, and within a second bandwidth that is less than the first bandwidth. The one or more preview channels of digital audio data may represent a monophonic audio signal or a two-channel stereophonic signal, for example. The number of channels may be chosen to meet the needs of a particular application.

In one exemplary implementation, the decoded digital audio data comprises 24-bit samples at a rate of 96 kHz to represent aural content within a bandwidth of about 48 kHz. The processor 20 produces one preview channel of digital audio data that comprises 16-bit samples at a rate of 19.2 kHz to represent the aural content with a bandwidth of about 9 kHz. This may be done by rendering all aural content into some specified number of channels, down mixing the rendered channels into one channel, applying a low pass filter to the down-mixed channel and down sampling the bandwidth-limited channel to the desired sample rate to obtain the preview channel of digital audio data. If desired, the rendered channels may be down mixed into two or more channels, which may be processed in a similar manner to generate two or more preview channels. Alternatively, the processor 20 may render the aural content into the number of channels to be used for the preview channels, thereby eliminating the need for a separate down mixing step. Dynamic-range compression or some form of attenuation may be used to prevent or at least mitigate the effects of any arithmetic calculations with digital audio data experiencing overflow.

A description of how aural content can be rendered into an appropriate number of channels may be obtained from international patent application publication WO 2013/006330 entitled "System and Tools for Enhanced 3D Audio Authoring and Rendering," published Jan. 10, 2013.

The assembler 30 receives the one or more preview channels of digital audio data from the path 21 and assembles this data with the respective frame of encoded digital audio data into an output signal. In preferred implementations, the encoded digital audio data and the one or more preview channels of digital audio data are arranged in frames with any metadata that is needed to process the encoded digital audio data or the preview channels of digital audio data. Neither the method of assembling data into an output signal nor the format of the assembled output signal is critical in principle to the present invention but the format of the output signal should conform to any requirements that are imposed by the application that uses the output signal.

The assembler 30 transmits the output signal as an electromagnetic signal along the communication path 31. The communication path 31 may be an electrical conductive path such as a copper wire or circuit board trace, an optical waveguide such as an optical fiber or any other medium that is capable of conveying an electromagnetic signal. This signal may be conveyed by the communication path 31 to other devices for immediate use or it may be recorded on a non-transitory medium 40 using essentially any recording technology including magnetic tape, cards or disk, optical cards or disc, and detectable markings on media including paper.

When recorded on the medium 40, the encoded digital audio data and the one or more preview channels of digital audio data may be arranged in frames of digital information. A respective frame of the digital information includes encoded digital audio data representing spatial position and aural content for each of one or more audio objects as discussed above, and one or more preview channels of digital audio signals with aural content that corresponds to the aural content of the encoded digital audio data. The spatial position of each audio object is expressed as a position relative to a reference location, and the encoded digital audio data represent the aural content with a first level of accuracy within a first bandwidth. The one or more preview channels of digital audio signals represent the aural content with a second level of accuracy that is less than the first level of accuracy and within a second bandwidth that is less than the first bandwidth.

The digital information recorded on the medium 40 may also include additional encoded representations of the same aural content. For example, each frame of the digital information may include one or more "legacy channels" of encoded data representing the aural content in a representation that conforms to older cinema soundtrack standards such as the Dolby Digital and ITU-R BS.775 standards. By including legacy-channel data on the medium 40, a legacy sound system may be used if a Dolby Atmos system is not available.

B. System to Use Medium

Figure 2:
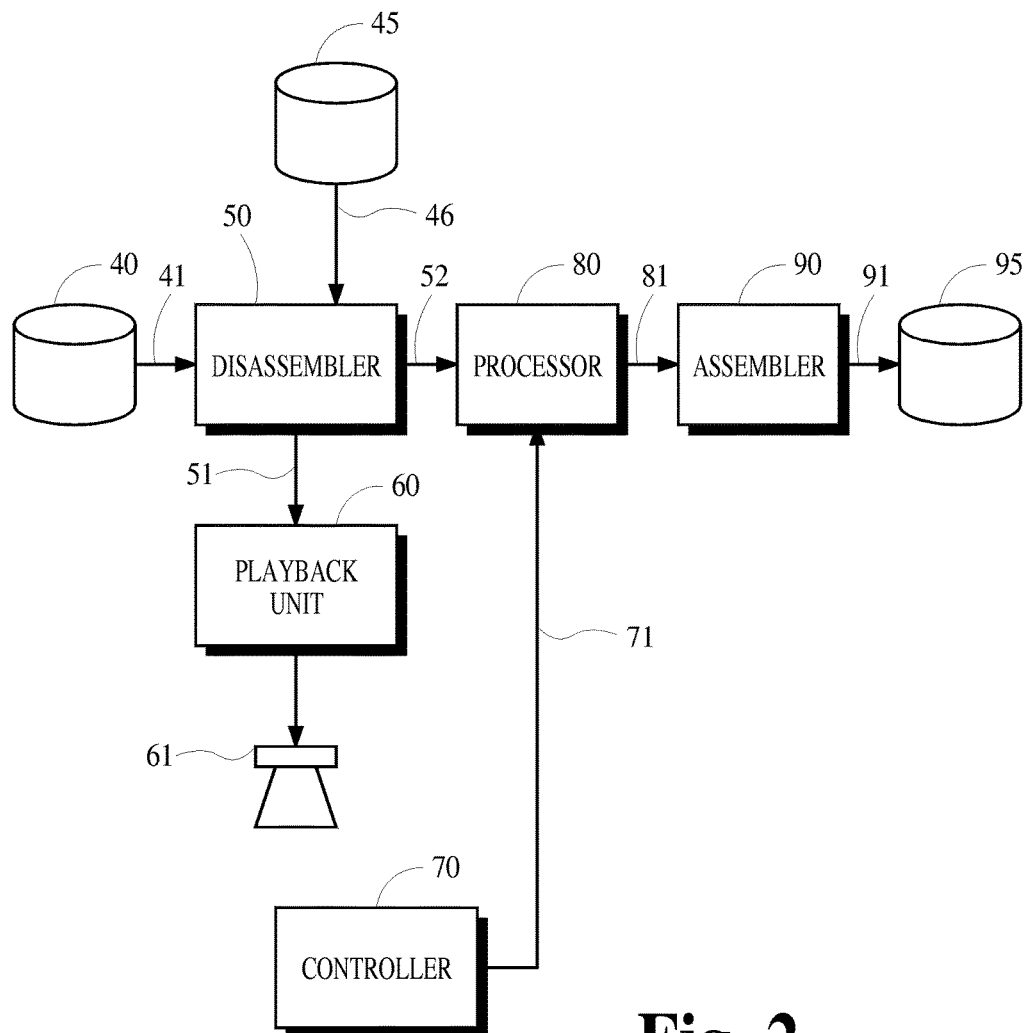
FIG. 2 is a schematic block diagram of a system that processes the medium with digital audio data that was generated by the system illustrated in FIG. 1.

FIG. 2 illustrates a schematic block diagram of an exemplary system that uses a medium that records digital audio data according to teachings of the present invention. In this exemplary system, the disassembler 50 receives from the path 41 an input sequence of frames of digital information from the medium 40. The disassembler 50 obtains one or more preview channels of digital audio data from a respective frame of the digital information and passes this digital audio data along the path 51 to the playback unit 60. Conventional methods for extracting information from an encoded signal may be used. Nor particular method of disassembly is critical to the present invention.

The playback unit 60 generates one or more preview audio signals from the one or more preview channels of digital audio data and passes these preview audio signals to one or more acoustic transducers 61 for presentation to an operator. The acoustic transducers may be headphones or one or more loudspeakers, for example. Alternatively or in addition to the acoustic transducer, the preview audio signals may be presented visually to the operator such as by showing waveforms or signal levels on a video monitor, an oscilloscope, a volume unit (VU) meter, or any other suitable display device.

In one implementation, one preview channel of digital audio data comprises conventional pulse-code modulation (PCM) encoded samples. In this implementation, the playback unit 60 may consist of little more than a digital-to-analog converter to convert the PCM encoded samples into an analog audio signal and an audio amplifier to produce an audio signal with sufficient power to drive the acoustic transducer 61.

The operator is provided with the controller 70, which allows the operator to initiate commands for controlling the processor 80. An indication of these commands is passed along the path 71 to the processor 80. These commands may instruct the processor 80 to remove, replace or add data representing aural content to the digital information that is recorded on the medium 40.

The controller 70 may be implemented in any way that can indicate the operator's choice of command and choice of aural content to remove, replace or add. The operator may monitor the presentation of the preview audio signals and identify the frames of aural content to be removed, replaced or added. For example, the operator may monitor the preview audio signals to identify periods of silence during which aural content can be changed without creating objectionable artifacts in the resulting audio data.

The choice of aural content can be the content of the frame that corresponds to the preview audio signals that were presented to the operator at or proximate to the time that the operator initiated the command. For example, the controller 70 could be a set of switches, a computer or other circuitry that responds to the press of one or more buttons and generates along the path 71 one or more control signals that indicate the choice of command. The choice of content could be indicated by the time at which the operator initiated the command. This time could be conveyed by information encoded into the control signals or by the arrival time of the control signals at the processor 80.

The processor 80 receives the input sequence of frames of digital information from the path 52 and removes, replaces or adds aural content to the digital information in response to the operator commands received from the path 71. These operations, which are discussed in more detail below, generate an output sequence of frames of digital information that are passed along the path 81.

The assembler 90 receives the output sequence of frames from the path 81 and assembles it into an output signal that is passed along the path 91 for immediate use by other devices or for recording on the medium 95 using essentially any recording technology including magnetic tape, cards or disk, optical cards or disc, and detectable markings on media including paper. In preferred implementations, the output sequence of frames is arranged with any metadata in the frames that is needed to process the encoded digital audio data or the preview channels of digital audio data. Neither the method of assembling data into an output signal nor the format of the assembled output signal is critical in principle to the present invention but the format of the output signal should conform to any requirements that are imposed by the application that uses the output signal.

C. Processor Operations

The processor 80 may remove, replace and add aural content to the frames of digital information in a variety of ways. Two ways are discussed in the following paragraphs. The first way cuts and splices sequences of frames of digital information to produced modified sequences of frames of digital information. The second way modifies metadata in the digital information so that cuts and splices are put into effect at the time the digital information is decoded and rendered for playback.

1. Removal

Figure 3:
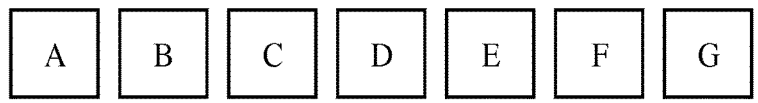
FIGS. 3 to 6 are conceptual schematic block diagrams showing frames of digital information and results of processing performed by the system illustrated in FIG. 2.

FIG. 3 is a conceptual schematic block diagram that shows a sequence of frames of digital information recorded on the medium 40. Frame A contains encoded digital audio data representing the aural content of audio objects and possibly one or more fixed channels within a first interval of time. Frame B contains encoded digital audio data representing the aural content of audio objects and possibly one or more fixed channels within a subsequent second interval of time that is adjacent to the first interval of time. Frame C contains encoded digital audio data representing the aural content of audio objects and possibly one or more fixed channels within a third interval of time that is adjacent to and is subsequent to the second interval of time. Frames D through G in the sequence of frames, as well as other sequences of frames shown in other figures, contain encoded digital information representing the aural content of audio objects and possibly one or more fixed channels within adjacent intervals of time in a manner that is similar to what is described for frames A through C. Adjacent intervals may overlap, may abut one another or may have a gap between them.

Figure 4:
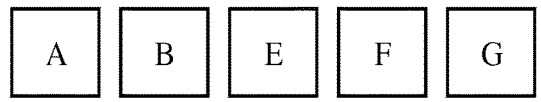

A removal operation essentially cuts one or more frames of digital information from a sequence of frames. The effect of a cut is shown conceptually in FIG. 4. As compared to the sequence of frames in FIG. 3, frames C and D have been removed from the sequence of frames shown in FIG. 4. One or more frames may be removed in one of at least two ways.

A first technique for removal creates a modified copy of an original sequence of frames by copying the digital information in all frames that are not removed. For the example shown, the digital information in frames A, B and E through G is copied but the digital information in frames C and D are not copied. If the frames contain metadata, the metadata in one or more of the copied frames may need to be modified so that the modified sequence of frames conforms to any requirements imposed on the digital information.

A second technique for removal creates a modified copy of an original sequence of frames by modifying only the metadata in one or more frames so that the process used to decode and playback the modified sequence of frames skips the frames selected for removal. The frames of digital information that are selected for removal are not actually removed from what is recorded on the medium 40. Instead, the decode and playback process performs the removal at the time of playback by skipping the selected frames of digital information. Preferably, the playback process performs a cross-fade between audio data adjacent to and on either side of the location of the cut.

If the modified sequence of output frames is recorded on to a medium, sections of the one or more preview tracks of digital audio data should also be removed. In preferred implementations, this is accomplished automatically by the same process that removes the selected frames of digital information.

If the medium 40 also contains one or more additional encoded representations of the same aural content such as, for example, the legacy channels mentioned above, preferred implementations of the present invention also remove corresponding portions of these additional representations. This may be done more easily if the additional representations are arranged in frames that correspond to the frames of encoded digital audio data. Frames of additional representations that correspond to the frames of digital information that are selected for removal may be removed by actually omitting them from the modified sequence of output frames or by modifying metadata to cause a playback process to skip them.

2. Addition

Figure 5:
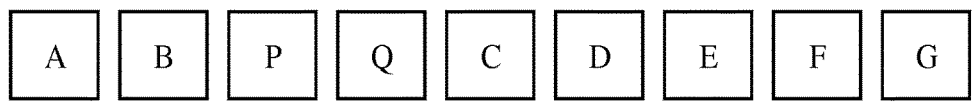

An addition operation essentially adds or inserts one or more frames of digital information in a sequence of frames. The effect of an add or insert is shown conceptually in FIG. 5. As compared to the sequence of frames in FIG. 3, frames P and Q have been added to the sequence of frames shown in FIG. 5. One or more frames may be added in one of at least two ways.

A first technique for addition creates a modified copy of an original sequence of frames by copying the digital information in all original frames and inserts new frames of digital information at a selected location. For the example shown, the digital information in frames A through G are copied with new frames P and Q inserted at a specified location in the sequence. If the frames contain metadata, the metadata in one or more of the frames may need to be modified so that the modified sequence of frames conforms to any requirements imposed on the digital information.

A second technique for addition adds a new frame of digital information and also creates a modified copy of an original sequence of frames by modifying only the metadata in one or more frames so that the process used to decode and playback the modified sequence of frames inserts the frames selected for addition. The decode and playback process performs the addition or insertion at the time of playback by adding the selected frames of digital information. Preferably, the playback process performs a cross-fade between audio data adjacent to and on either side of the start and end locations of the added frames.

If the modified sequence of output frames is recorded on to a medium, preview tracks of digital audio data should also be added. In preferred implementations, this is accomplished automatically by the same process that adds the selected frames of digital information.

If the medium 40 also contains one or more additional encoded representations of the same aural content such as, for example, the legacy channels mentioned above, preferred implementations of the present invention also add corresponding portions of these additional representations. This may be done more easily if the additional representations are arranged in frames that correspond to the frames of encoded digital audio data. Frames of additional representations that correspond to the frames of digital information that are selected for addition may be added by actually inserting them into the modified sequence of output frames or by modifying metadata to cause a playback process to insert them.

3. Replacement

Figure 6:
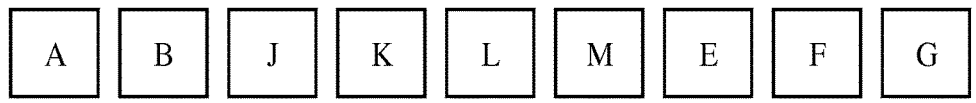

A replacement operation essentially replaces one or more frames of digital information in a sequence of frames with the information content of other frames. The effect of a replacement is shown conceptually in FIG. 6. As compared to the sequence of frames in FIG. 3, frames C and D have been replaced with frames J through M in the sequence of frames shown in FIG. 6. A replacement is conceptually equivalent to a removal and an addition of frames at the same location in an original sequence of frames. One or more frames may be replaced by using any of the ways described above for removal and addition.

If the modified sequence of output frames is recorded on to a medium, preview tracks of digital audio data should also be replaced. In preferred implementations, this is accomplished automatically by the same process that replaces the selected frames of digital information.

If the medium 40 also contains one or more additional encoded representations of the same aural content such as, for example, the legacy channels mentioned above, preferred implementations of the present invention also replace corresponding portions of these additional representations. This may be done more easily if the additional representations are arranged in frames that correspond to the frames of encoded digital audio data. Frames of additional representations that correspond to the frames of digital information that are selected for replacement may be replaced by removing and adding as described above.

4. Timing and Location

The command received from the path 71 informs the processor 80 of the starting location in the sequence of frames where one or more frames are to be removed or replaced, or the insertion location where frames are to be added. This may be done in a number of ways. A few ways are described here. No particular way is critical to the present invention.

In one implementation, the disassembler 50 passes each frame of digital information to the processor 80 at substantially the same time as the playback unit 60 presents the corresponding preview audio signal to the operator. Little or no delay may be required in any processing path of the disassembler 50 for those implementations that represent the preview channels of audio data with PCM samples because the playback process for this type of data is essentially instantaneous. The processor 80 may select the location within the sequence of frames for the requested operation as being the frame that is received from the disassembler 50 at the instant the command is received from the path 71. If desired, the system may allow for delays caused by operator reaction time and select a location proximate to the time the command is received, perhaps 200 ms earlier, by having the disassembler 50 and/or the processor 80 store the sequence of frames in first-in-first-out storage for the specified delay time.

Alternatively, the controller 70 can receive information from the disassembler 50 that identifies the frame of digital information that corresponds to the preview audio signal as that signal is presented to the operator. An indication of the frame that corresponds to the time the operator initiated a command is passed along the path 71 to the processor 80. If desired, the system may allow for delays caused by operator reaction time as described above.

The removal and replacement operations also require the identification of the ending location of the frames to be removed or replaced. This may be done in a variety of ways. One way requires the operator to specify the ending time in the same manner described above for the starting location. Another allows the operator to specify the interval by entry of some information by an input device such as a keyboard of the controller 70. If desired, the system may assume some default interval, perhaps 500 ms, if the operator does not expressly indicate the ending location.

The addition and replacement operations also require identification of the aural content to be added or substituted. This may be done by an input device of the controller 70. In one implementation, digital information representing a library of aural content is stored on the medium 45. A track of aural content in the library can be selected and its start and length can be specified through the controller 70. If desired, the tracks of aural content in the library can be passed to the disassembler along the path 46 so that corresponding preview audio signals can be presented to the operator to assist in the selection of the aural content for addition or replacement.

In general, the starting and ending locations of the frames of aural content to be removed, replaced or added are preferably chosen to be within intervals of little or no audible content. By choosing appropriate starting locations, ending locations, insertion locations, replacement frames, and/or additional frames, audible artifacts resulting from the removal, replacement, and/or addition of frames can be avoided or minimized.

D. Implementation

Figure 7:
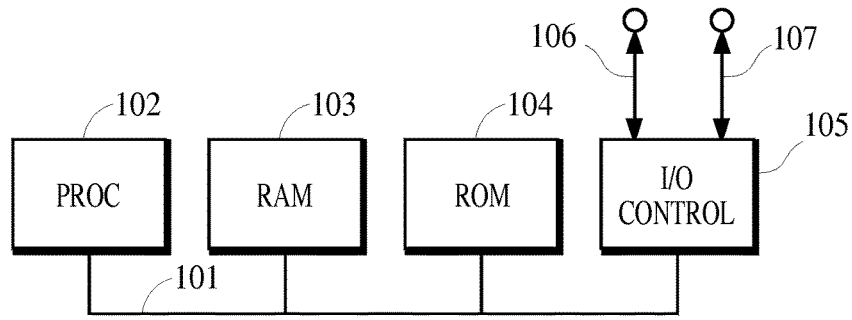
FIG. 7 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 7 is a schematic block diagram of a device 100 that may be used to implement aspects of the present invention. The processor 102 provides computing resources. RAM 103 is system random access memory (RAM) used by the processor 102 for processing. ROM 104 represents some form of persistent storage such as read only memory (ROM) for storing programs needed to operate the device 100 and possibly for carrying out various aspects of the present invention. I/O control 105 represents interface circuitry to receive and transmit signals by way of the communication channels 106, 107. In the embodiment shown, all major system components connect to the bus 101, which may represent more than one physical or logical bus; however, a bus architecture is not required to implement the present invention.

In embodiments implemented by a general purpose computer system, additional components may be included for interfacing to devices such as a keyboard or mouse and a display, and for controlling a device 108 having a non-transient recording medium such as magnetic tape or disk, or an optical medium. The non-transient recording medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable non-transient recording media that convey information using essentially any recording technology including magnetic tape, cards or disk, optical cards or disc, and detectable markings on media including paper.

The invention claimed is:

1. A method for processing audio signals, the method comprising:
   receiving an electromagnetic input signal conveying encoded digital audio data arranged in frames and representing spatial position and aural content for each of one or more audio objects, wherein the spatial position of each audio object is expressed relative to a reference location, each audio object corresponds to one or more audio sources and the encoded digital audio data represents the aural content with a first level of accuracy within a first bandwidth;
   decoding a respective frame of the encoded digital audio data to generate decoded digital audio data;
   processing the decoded digital audio data to generate one or more preview channels of digital audio data that represent the aural content of the respective frame of the encoded digital audio data with a second level of accuracy and within a second bandwidth, wherein the second level of accuracy is less than the first level of accuracy and the second bandwidth is less than the first bandwidth;
   assembling the one or more preview channels of digital audio data with the respective frame of the encoded digital audio data into an output signal; and
   transmitting the output signal as an electromagnetic signal along a communication path.

2. The method of claim 1 wherein the encoded digital audio data also represents one or more fixed-channel signals conveying aural content, wherein each of the fixed-channel signals corresponds to a fixed position relative to the reference location.

3. A non-transitory medium recording digital information arranged in frames, the digital information in a respective frame comprising:
   encoded digital audio data representing spatial position and aural content for each of one or more audio objects, wherein the spatial position of each audio object is expressed relative to a reference location, each audio object corresponds to one or more audio sources and the encoded digital audio data represent the aural content with a first level of accuracy within a first bandwidth; and
   one or more preview channels of digital audio data with aural content that corresponds to the aural content of the encoded digital audio data with a second level of accuracy and within a second bandwidth, wherein the second level of accuracy is less than the first level of accuracy and the second bandwidth is less than the first bandwidth.

4. The medium of claim 3, wherein the encoded digital audio data also represent one or more fixed-channel signals conveying additional aural content at a fixed position relative to the reference location.

5. The medium of claim 3, wherein the digital information in the respective frame comprises one or more legacy channels of audio data that are psychoacoustically-encoded representations of the aural content of the encoded digital audio data.

6. A method for processing digital information arranged in frames, wherein the method comprises:
receiving an input sequence of frames of the digital information, wherein the digital information comprises encoded digital audio data representing spatial position and aural content for each of one or more audio objects, wherein the spatial position of each audio object is expressed relative to a reference location, wherein each audio object corresponds to one or more audio sources and wherein the encoded digital audio data represent the aural content with a first level of accuracy within a first bandwidth, wherein the digital information further comprises one or more preview channels of digital audio data with aural content that corresponds to the aural content of the encoded digital audio data with a second level of accuracy and within a second bandwidth, wherein the second level of accuracy is less than the first level of accuracy and the second bandwidth is less than the first bandwidth;
presenting to an operator the aural content of the one or more preview channels of digital audio signals from the input sequence of frames of the digital information;
receiving a command from the operator indicating that one or more frames of digital information are to be removed from, replaced in or added to the sequence of frames;
modifying the input sequence of frames of the digital information at a location indicated by the operator to generate an output sequence of frames of digital information, wherein the input sequence of frames of the digital information is modified in response to the command to cause a removal, replacement or addition of aural content during playback of the digital information; and
outputting the output sequence of frames of digital information for recording on a medium or for transmission along a communication path.

7. The method of claim 6, wherein the encoded digital audio data also represent one or more fixed-channel signals conveying additional aural content at a fixed position relative to the reference location.

8. The method of claim 6, wherein the digital information in the respective frame comprises one or more legacy channels of audio data that are psychoacoustically-encoded representations of the aural content of the encoded digital audio data.

9. The method of claim 6, wherein:
the command is received at a time during the presenting of the aural content of the one or more preview channels of digital audio signal; and
the location indicated by the operator is proximate to a frame in the input sequence of frames that conveys the aural content that was presented to the operator at the time the command was received.

10. An apparatus for processing audio signals, the apparatus comprising one or more processors configured to:
receive an electromagnetic input signal conveying encoded digital audio data arranged in frames and representing spatial position and aural content for each of one or more audio objects, wherein the spatial position of each audio object is expressed relative to a reference location, each audio object corresponds to one or more audio sources and the encoded digital audio data represents the aural content with a first level of accuracy within a first bandwidth;
decode a respective frame of the encoded digital audio data to generate decoded digital audio data;
process the decoded digital audio data to generate one or more preview channels of digital audio data that represent the aural content of the respective frame of the encoded digital audio data with a second level of accuracy and within a second bandwidth, wherein the second level of accuracy is less than the first level of accuracy and the second bandwidth is less than the first bandwidth;
assemble the one or more preview channels of digital audio data with the respective frame of the encoded digital audio data into an output signal; and
transmit the output signal as an electromagnetic signal along a communication path.

11. The apparatus of claim 10, wherein the encoded digital audio data also represent one or more fixed-channel signals conveying additional aural content at a fixed position relative to the reference location.

12. The apparatus of claim 10 wherein processing the decoded digital audio data comprises rendering each audio object to into N channels and downmixing the N channels into M channels, wherein M is the number of preview channels and N is greater than M.

13. The apparatus of claim 10 wherein processing the decoded digital audio data comprises rendering each audio object into N channels, where N is the number of channels to be used for the preview channels.

14. The apparatus of claim 10, wherein processing the decoded digital audio data further comprises one or more of:
down sampling the aural content for the one or more audio objects;
low pass filtering the aural content for the one or more audio objects;
down sampling the one or more preview channels;
low pass filtering the one or more preview channels; and
applying dynamic-range compression to prevent the one or more preview channels from overloading.

15. An apparatus for processing digital information arranged in frames, wherein the apparatus comprises one or more processors configured to:
receive an input sequence of frames of the digital information, wherein the digital information comprises encoded digital audio data representing spatial position and aural content for each of one or more audio objects, wherein the spatial position of each audio object is expressed relative to a reference location, wherein each audio object corresponds to one or more audio sources and wherein the encoded digital audio data represent the aural content with a first level of accuracy within a first bandwidth, wherein the digital information further comprises one or more preview channels of digital audio data with aural content that corresponds to the aural content of the encoded digital audio data with a second level of accuracy and within a second bandwidth, wherein the second level of accuracy is less than the first level of accuracy and the second bandwidth is less than the first bandwidth;
present to an operator the aural content of the one or more preview channels of digital audio signals from the input sequence of frames of the digital information;
receive a command from the operator indicating that one or more frames of digital information are to be removed from, replaced in or added to the sequence of frames;

modify the input sequence of frames of the digital information at a location indicated by the operator to generate an output sequence of frames of digital information, wherein the input sequence of frames of the digital information is modified in response to the command to cause a removal, replacement or addition of aural content during playback of the digital information; and output the output sequence of frames of digital information for recording on a medium or for transmission along a communication path.

16. The apparatus of claim 15, wherein the encoded digital audio data also represent one or more fixed-channel signals conveying additional aural content at a fixed position relative to the reference location.

17. The apparatus of claim 15, wherein the digital information in the respective frame comprises one or more legacy channels of audio data that are psychoacoustically-encoded representations of the aural content of the encoded digital audio data.

18. The apparatus of claim 15, wherein:
the command is received at a time during the presenting of the aural content of the one or more preview channels of digital audio signal; and
the location indicated by the operator is proximate to a frame in the input sequence of frames that conveys the aural content that was presented to the operator at the time the command was received.

19. A non-transitory medium recording a program of instructions, which, when executed by a device, causes the device to perform the method of claim 1.

20. A non-transitory medium recording a program of instructions, which, when executed by a device, causes the device to perform the method of claim 6.

* * * * *